United States Patent
Spence et al.

(10) Patent No.: US 10,189,582 B1
(45) Date of Patent: Jan. 29, 2019

(54) ELASTICALLY DEPLOYABLE PANEL STRUCTURE SOLAR ARRAY

(71) Applicant: Deployable Space Systems, Inc., Goleta, CA (US)

(72) Inventors: Brian R Spence, Solvang, CA (US); Stephen F White, Ventura, CA (US); Mark V Douglas, Santa Barbara, CA (US)

(73) Assignee: DEPLOYABLE SPACE SYSTEMS, INC., Santa Barbara, CA (US)

( * ) Notice: Subject to any disclaimer, the term of this patent is extended or adjusted under 35 U.S.C. 154(b) by 0 days.

(21) Appl. No.: 14/881,106

(22) Filed: Oct. 12, 2015

Related U.S. Application Data

(63) Continuation of application No. 13/862,133, filed on Apr. 12, 2013, now Pat. No. 9,156,568.

(60) Provisional application No. 61/624,595, filed on Apr. 16, 2012.

(51) Int. Cl.
*B64G 1/44* (2006.01)
*B64G 1/22* (2006.01)
*H02S 30/20* (2014.01)

(52) U.S. Cl.
CPC ............. *B64G 1/222* (2013.01); *B64G 1/443* (2013.01); *H02S 30/20* (2014.12)

(58) Field of Classification Search
USPC ................................ 244/172.6, 172.7, 172.9
See application file for complete search history.

(56) References Cited

U.S. PATENT DOCUMENTS 7,806,370 B2 * 10/2010 Beidleman ............. B64G 1/222
136/245

\* cited by examiner

*Primary Examiner* — Brian M O'Hara
(74) *Attorney, Agent, or Firm* — R. Scott Kimsey, Esq.; Klein DeNatale Goldner

(57) ABSTRACT

An elastically deployable panel structure for space solar array applications includes a support structure having a first stowed configuration and a second deployed configuration. The stowed configuration has elastic strain energy that powers deployment of the support structure. The elastically deployable panel structure does not include a boom. Longitudinal edges of the support structure may be curved downward to form an open cylinder when in the deployed configuration. The support structure is configured to be operable as a mounting surface for solar cell arrays.

7 Claims, 6 Drawing Sheets

ELASTICALLY DEPLOYABLE PANEL STRUCTURE SOLAR ARRAY

RELATED APPLICATIONS

This application claims priority to U.S. patent application Ser. No. 13/862,133, filed Apr. 12, 2013 and entitled "Elastically Deployable Panel Structure Solar Arrays," which in turn claims priority to U.S. Provisional Patent Application No. 61/624,595, filed Apr. 16, 2012.

BACKGROUND

1. Field

The present invention relates to solar cell arrays for use on spacecraft and, in particular, solar cell arrays comprised of a simple elastically deployable panel structural assembly consisting of integrated common-modular photovoltaic assemblies for powering spacecraft during long missions in space.

2. Background

Most deployable solar arrays for spacecraft have used crystalline solar cells mounted to rigid honeycomb panels. Certain prior art describes mechanisms to effectively package, carefully deploy, and maintain the shape of arrays of rigid panels. Flexible solar arrays have also been used, but have been limited to crystalline solar cell arrays packaged in a long roll or pleated stack that is deployed using a separate boom or booms.

Spacecraft most commonly use solar cells to collect solar radiation and convert it into the electrical power necessary to operate the spacecraft. The solar cells are normally disposed on a solar array. A solar array typically comprises one or more solar panels electrically attached to each other and to the spacecraft. Each solar panel in an array typically comprises numerous individual solar cells, which are usually laid out in rows and connected together electrically at their adjacent edges. These photovoltaic cells form a two-dimensional array and are frequently mounted on a rigid honeycomb composite solar panel.

Optimization of standard solar array systems (complete/assembled structural and electrical wing system) incorporating standard thickness multijunction solar cells (nominally 140 um thick cells with 100 um thick coverglass) are approaching ~100 W/kg BOL specific power and ~13 kW/m3 stowed packaging performance plateaus. Current state-of-the-art optimized solar array systems utilize heavy carbon composite honeycomb panel-structures to provide necessary deployed/stowed strength and stiffness (frequency) to meet mission requirements. Additionally, these current rigid honeycomb panel solar arrays require very complex and complicated synchronization mechanisms to ensure reliable and repeatable deployment control. Other promising solar array arrays that incorporate flexible blanket technologies promise even higher specific power beyond 100 W/kg and more compact stowed packaging performance, but because these structures must also support and protect the standard-thickness heavy multijunction solar cells their performance metrics are also reaching a plateau. These lighter weight flexible blanket solar arrays always require complex mechanisms to ensure reliable and repeatable deployment control. State-of-the-art deployable solar array structures also occupy large stowage volumes. In some cases the large stowage envelopes are beginning to interfere within the allocated launch volumes and are prohibiting the ability to provide significant power growth for future missions (i.e., more power requires more volume, which is not available).

The new solar array described herein, an elastically deployable panel structure, has been created to significantly simplify the complex mechanisms required for deployment control, and to significantly simplify the overall structure composition to provide high specific power, low/mid power capability, high reliability, compact stowed volume, high structural performance (stiffness), modularity, reconfigurability, simplicity/reduction in piece part components, and affordability.

The primary prior art solar arrays in the subject field are comprised of rigid honeycomb panel structures interconnected with discrete hingelines and deployment mechanization. These solar array types are not elastically deployable structures that deploy from their own strain energy, but are prior art in terms of solar array systems in the relevant field.

Flexible photovoltaic arrays have also been implemented in the subject field. The most notable and technically mature flexible blanket solar arrays produced to date, and an indication of their blanket construction, are listed below:

ATK's UltraFlex™ which is a radial rib structure with tensioned single layer open weave mesh substrate blanket (open backside)—motor driven deployment.

Lockheed Martin's SAFE (Solar Array Flight Experiment), International Space Station (JSS), and Milstar all of which are a central structure tensioned rectangular Kapton® glass-reinforced blanket—motor driven deployment.

ESA/British Aerospace Hubble Space Telescope (HST) which is a dual-side structure tensioned rectangular Kapton® glass-reinforced blanket—motor driven deployment.

AEG-Telefunken/Spar Aerospace L-SAT and Olympus which is a central structure with tensioned rectangular Kapton® glass-reinforced blanket—motor driven deployment.

Northrop Grumman (TRW) EOS-AM/Terra and APSA which is a central structure with tensioned rectangular Kapton® carbon-reinforced blanket—motor driven deployment.

Boeing (Hughes) FRUSA which is a dual-sided structure tensioned rectangular Kapton® glass-reinforced blanket—motor driven deployment.

DSS ROSA—Roll-Out-Solar-Array which is a dual side structure tensioned rectangular dimensionally stable blanket—elastically deployable or motor driven deployment.

With the exception of DSS's ROSA solar array, all past solar array flexible blanket solar arrays developed, built, and flown to date are deployed through electrical motor actuation. As such, these past solar arrays are not elastically deployable structures, except the DSS ROSA system. DSS's innovative Roll-Out Solar Array (ROSA) relies on a highly reliable innovative self-elastically deployable Roll-Out Boom that deploys immediately and predictably under its own strain energy. One other notable solar system that is in development that also does not deploy with a motor is from Composite Technology Development (CTD). CTD's non-motor driven solar array integrates unique elastic memory composite materials ("EMC," also referred to as shape memory composites or "SMC") that deploys from a stowed state to a deployed state through the application of heat.

SUMMARY

The proposed elastically deployable panel structure for solar array applications that is described herein is uniquely different from all solar array structures to date, and as previously referenced. The panel solar array structure does not consist of separate boom(s) used to deploy a separate flexible solar array blanket, but rather the entire assembly is a unified panel structure that uniquely serves a dual use purpose as the structural platform and the carrier for the photovoltaic modules. Photovoltaic modules may be mounted to the panel structure itself or to windows within the panel structure. The elastically deployable panel structure may be rolled or folded to a compact stowage volume and forms a stiff, stable, structure when deployed. Implementation of an elastically deployable panel structure minimizes the required deployment mechanization, reduces parts count, increases the system reliability and reduces the system cost. The proposed embodiment targets small to mid-power-level solar array applications and eliminates the deficiencies of current state-of-the-art solar array structure technologies.

An elastically deployable panel structure for a space solar array is disclosed. The elastically deployable panel structure for space solar array applications comprises a panel support structure that is rolled upon stowage, yet transformable to a stiff non-planar configuration upon deployment. The stiff non-planar configuration is operable as a mounting surface for solar cell arrays. The elastic strain energy is captured upon being rolled into the stowed configuration and released upon deployment to empower the transition from stowage to deployment.

The panel support structure comprises a rectangular planar surface that has a top surface and a bottom surface opposite the top surface, an inboard edge and an outboard edge opposite the inboard edge, and two longitudinal edges. Each of the two longitudinal edges are perpendicular to both the inboard edge and the outboard edge. Each has a long axis parallel to the longitudinal edges, and a short axis parallel to both the inboard edge and the outboard edge. Each of the two longitudinal edges are reversibly curled towards the bottom surface to form an open cylinder in the deployed configuration, yet can be flattened to enable rolling in the stowed configuration.

The panel support structure also has twin mandrel sections with a contacting perimeter and a rotational axis. Each of the twin mandrel sections is placed at a top corner defined by the outboard edge and each of the two longitudinal edges. The rotational axis of each mandrel section is parallel to the short axis of the outboard edge. A closed length of hook and loop strip comprises each contacting perimeter and is mateable with a corresponding strip of hook and loop strip placed topside along each of the two longitudinal edges. This enables the support structure to be rolled around the twin mandrel sections to form a stowed configuration. Securement of the stowed configuration is maintained via contact between the mateable hook and loop strips attached to the top and bottom structure surfaces adjacent to the two longitudinal edges.

A deployment initiation system enables the transition from the rolled stowed configuration to the extended deployed configuration. The deployment initiation system is operable for initiating the release of elastic energy captured via flattening the reversibly curled edges of each of the two longitudinal edges during the rolling procedure of the stowed configuration.

A disclosed embodiment focuses on coupling standard and advanced space-qualified photovoltaics (PV) onto a simple innovative ultra-lightweight compactly-stowable elastically self-deployable panel structure solar array system. The disclosed technology is quite possibly the simplest solar array construction ever developed. The disclosed solar array technology has been specifically designed to reduce risk, cost, mass, and stowage volume, while increasing the power system capability for small-to-mid-sized satellites. The disclosed elastically deployable panel structure rolls-up, folds, or bends in the stowed configuration occupying an ultra-compact cylindrical, elongated pill shape, or other launch package, and then elastically deploys due to its own strain/spring energy. The deployment sequence for an embodiment of a disclosed solar array with rolled, cylindrical stowage volume is shown in FIG. 1. When fully deployed the disclosed solar array conforms to an integrated flat planar surface (onto which the PV is mounted) with deep-sectioned cylindrical-shaped longitudinal edges that provide high stiffness/strength. The outboard edge of the structure may be curled for added stiffness. The disclosed structure is stowed by flattening the substrate/panel/structure tip and then rolling the structure upon itself onto circular spools mounted to the tip, and continuing the rolling process towards the base. The panel structure may be constructed from fiber reinforced composite material or a high-strength metal sheet. When rolled for stowage, hook and loop Velcro® segments or other segments of interlocking material on opposing surfaces of the panel edges engage over the entire stowed wrap and ensure a rolling/linear deployment. The Velcro® segments also secure each rolled wrap in order to withstand radial and axial launch loads. The compact cylindrical structure is restrained against the spacecraft during launch using multiple preloaded straps or other tie-down methods. The stowed array interfaces onto two brackets or chalks mounted to the spacecraft. Deployment in initiated by activating tiedowns that release the straps, or other technique. The straps release via severing, heating/burning, activating a pin puller, or other function. Small, low-power, elastically deployed panel solar arrays may be deployed without rate control. If rate control is desired, a damper/lanyard system may be used. Alternatively, a damper/arm/roller system, located at the tip of the structure, may be used.

A second embodiment of the elastically deployable panel structure is shown in FIG. 2. The panel structure rolls up to form an elongated pill shape when stowed. The reduced stowed thickness of the array over the cylindrical embodiment enables the solar array to stow within launch volumes of reduced thickness. When fully deployed this panel structure conforms to an integrated flat planar surface (onto which the PV is mounted) with deep-sectioned cylindrical-shaped longitudinal edges that provide high stiffness/strength. The outboard edge of the structure may be curled for added stiffness. Patches of photovoltaics are mounted to the planar surface of the structure with gaps between PV patches to allow the structure to bend. The structure is stowed by flattening the substrate/panel/structure tip and then rolling the structure upon itself onto pill-shaped spools mounted to the tip, and continuing the rolling process towards the base. When rolled for stowage, hook and loop Velcro® segments or other interlocking material located only in the curled zones of the structure ensure a rolling/linear deployment. Launch restraints located at the center, edges, of the stowed array secure the array to the spacecraft during launch. Low power elastically deployed panel solar arrays may be deployed without rate control. If rate control is desired, a damper/lanyard system that forms an expanding loop around the structure may be used. Alternatively, an edge-mounted lanyard may be used.

In one embodiment, an elastically deployable panel structure may include a support structure having a stowed configuration and a deployed configuration, the stowed configuration having elastic strain energy that operates to deploy the support structure. The support structure is operable to serve as a mounting surface for solar cell arrays. The elastic deployable panel structure does not include a boom.

One embodiment of the elastically deployable panel structure includes a top surface, a bottom surface, an inboard edge, an outboard edge, and opposing longitudinal edges.

The opposing longitudinal edges may be reversibly curved downward with respect to the bottom surface of the panel structure.

The support structure may define a plurality of openings therein, each of the plurality of openings configured to receive a solar cell array.

The solar cell arrays may be retained within the openings in the panel structure by tension between a plurality of edges of the solar cell arrays and a plurality of edges of the openings in the support structure.

At least one of the longitudinal edges may include an attachment strip to direct deployment of the panel structure during transition from the stowed configuration to the deployed configuration.

DETAILED DESCRIPTION

Glossary of Terms

Figure 1:
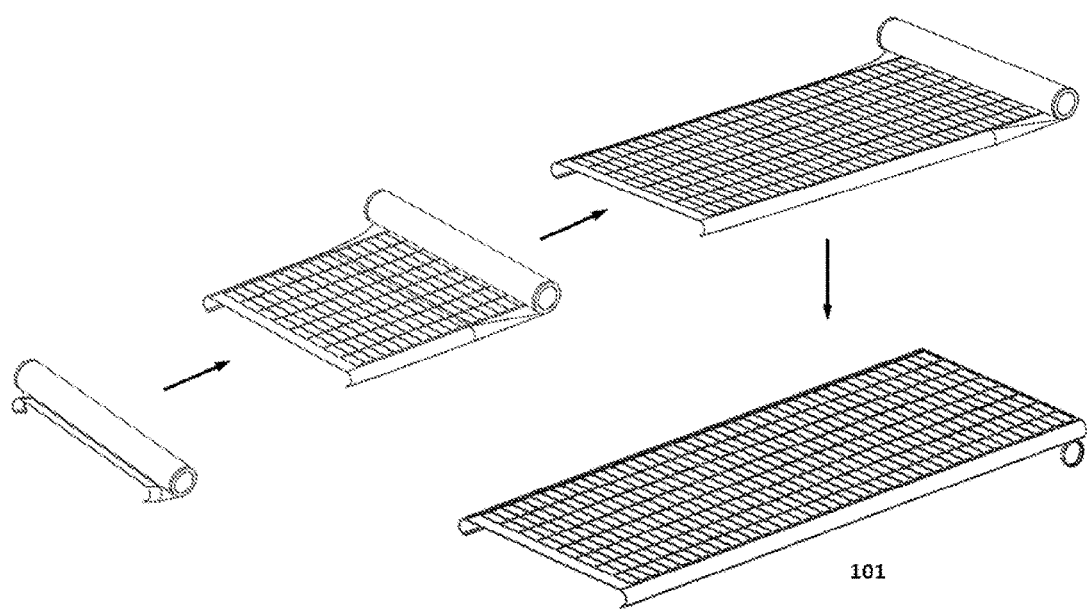
FIG. 1: Isometric view showing the deployment sequence of the elastically deployable panel structure solar array—cylindrical stowed configuration (101).

Solar Array System—A combined structural and electrical system which is stowable in a small volume for shipment and launch, and that is deployed in space to expose a large surface area of photovoltaic solar cell devices to the sun, and that is mechanically and electrically attached to a spacecraft vehicle to provide power for spacecraft operations.

Flexible solar array—A solar array that includes a rollable or foldable thin flexible blanket assembly or flexible panel assembly to which the photovoltaic solar cell devices and electrical circuitry are mounted.

Elastically Deployable Panel Structure—A self-deployable panel formed from thin, fiber-reinforced composite material or high strength metal sheet that can be rolled or folded into a compact stowage volume. The panel has non-planar regions that increase the stiffness of the structure after deployment. Groups of photovoltaic solar cells may be attached directly to the structure or may be mounted to a film sheeting which is then attached to the structure forming a solar array.

Flexible photovoltaic (PV) blanket assembly—A thin flexible panel substrate that has mounted to it an array of photovoltaic solar cells and associated wiring that can be folded or rolled into a small and compact package for stowage; and is attached to the deployable solar array structure for unfurling during deployment into a flat, aligned, and tensioned planar configuration when fully deployed.

Deployable solar array structure—The structural components of a flexible blanket solar array system that are attached to the flexible PV blanket ends and provide the motive force for blanket unfolding or unrolling deployments and deployed tensioning, and provide the primary deployed structural strength and stiffness characteristics of the solar array.

Solar cell rows—Numerous individual solar cells which are laid out in linear rows onto the flexible photovoltaic blanket assembly and connected together electrically at their adjacent edges. The number of solar cells that must be employed is a function of the anticipated spacecraft power demand, mission environment, and the solar cell efficiency.

Backplane—The planar structural portion of the flexible photovoltaic blanket assembly attached to the deployable solar array structure and tensioned when deployed; and comprised of an open weave mesh, a series of crossing cords, or malleable metallic strips that are suitable for high temperature survivability.

Elements Shown in the FIGS.

101—Elastically deployable panel structure solar array with cylindrical stowed volume.

102—Elastically deployable panel structure solar array with pill-shaped stowed volume.

103—Elastically deployable panel structure: A self-deployable panel formed from thin, fiber-reinforced composite material or high strength metal sheet that can be rolled or folded into a compact stowage volume. The panel has non-planar regions, located at opposing edges of the structure, that increase the stiffness of the structure after deployment. Groups of photovoltaic solar cells may be attached directly to the structure or may be mounted to a film sheeting which is then attached to the structure forming a solar array.

104—Roll, Solar Array: A compact cylindrical roll that is formed when the solar array is stowed. The roll, solar array is located at the tip of the array during deployment. The diameter of the roll decreases during array deployment until the array reaches full deployment. Hook and loop Velcro® segments or other segments of interlocking material on opposing surfaces of the panel edges ensure a rolling/linear deployment.

105—Solar Cells: Photovoltaic devices that converts incidence sunlight to electricity. Solar cells are electrically interconnected to achieve the desired voltage and current of the solar array. The solar cells can be bonded/mounted directly to the panel or bonded/mounted to a film which is then secured to the panel.

106—Interlocking Strip Material: Strips of hook and loop Velcro® or other interlocking material that are secured to opposing edge surfaces of the elastically deployable panel (103) to ensure a rolling/linear deployment.

107—Mandrel Loop: A circular mandrel loop is attached to the outboard edges of the panel (103). The mandrel loop is a structural component used to initiate the roll of the panel (103) during array stowage. The panel (103) is flattened prior to stowing the solar array.

108—Panel Slits: Through slits within the elastically deployable panel (103). Panel slits may be inserted into the panel (103) that correspond to spaces between rows of solar cells (105). The panel slits facilitate "faceting" of the stowed array in order to minimize the cell-to-panel bond stresses.

109—Panel Cutouts: Areas where material is removed from the elastically deployable panel (103). Panel cutouts are used to reduce the weight of the system and tailor the stowage characteristics of the solar array.

110—Elongated Mandrel: A pill-shaped structural mandrel is attached to the outboard edges of the panel (103). The elongated mandrel is used to initiate the rolling behavior of the panel (103) during array stowage. The panel (103) is flattened prior to stowing the solar array.

111—Interlocking Material Segments: Short hook and loop Velcro® segments or segments of other interlocking material that are secured to opposing edge surfaces of the elastically deployable panel (103) to ensure a rolling/linear deployment. The segments are secured to the curved ends of the mandrel (110). Velcro® segments are also secured to the edges of the panel structure between the areas populate with solar cells (105) where panel bending occurs.

112—Elongated Roll: A pill-shaped roll formed by the partially stowed Elastically Deployable Panel Solar Array (102) which is located at the tip of the solar array.

113—Launch Tiedown: A commercially available mechanism that is used to secure the solar array during launch. Deployment of the solar array is initiated by applying power to the launch tiedown.

114—Damper/Reel/Lanyard Assembly: A mechanism consisting of a rotational damper, reel and a lanyard that is wrapped on the reel. The assembly functions to slow the rate of array deployment if required. Alternate methods exist to control the rate of deployment of the elastically deployable solar array.

115—Lanyard: A thin strip or cord that is used within the Damper/Reel/Lanyard Assembly (114) to limit the rate of deployment of the solar array.

Two embodiments of elastically deployable panel structures for space solar array (101), (102), are disclosed. In the identified embodiments, the technology is described as the following: an elastically deployable panel structure for space solar array applications. The elastically deployable panel structure is rollable, foldable, or bendable to achieve a compact stowage volume. The deployable structure may include one or more panel structure modules mechanically interconnected in series; one or more flexible planar photovoltaic modules electrically interconnected in series and mechanically adhered to the panel structure surface or tensioned within an opening in the panel structure, and a deployment synchronization system to allow for repeatable and directional deployments. The deployable panel structures elastically collapse to a flat plane and can then either be rolled or folded for stowage, or can be wrapped around a spacecraft's perimeter for stowage. Structural deployment is motivated by the elastic strain energy of the one or more panel structures from their stowed state. Deployment control is provided to ensure a known and repeatable deployment path through an inter-wrap attachment strip on the one or more panel structures. When deployed the one or more panel structures have top facing planar surface regions on which one or more photovoltaic modules are attached, and other non-planar regions that increase the deployed stiffness and strength of the solar array structure. The panel structure transforms from a planar configuration when stowed that may be rolled or folded into a compact stowage volume to a stiff, non-planar configuration when deployed.

Figure 3:
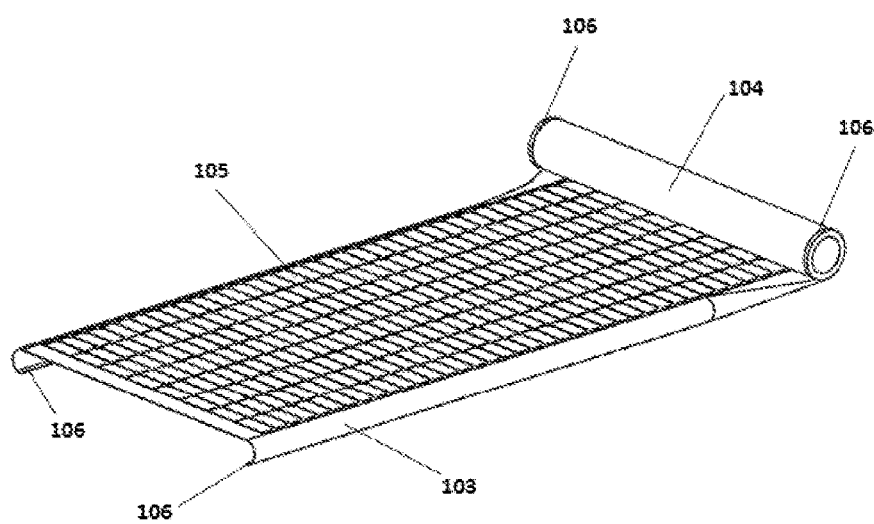
FIG. 3: Isometric view showing the elastically deployable panel structure solar array (cylindrical stowed configuration) in a partially deployed state. The Elastically Deployed Panel Structure (103) is fully deployed at the base which is the attachment interface for the spacecraft and forms a Roll (104) at the outboard tip. Solar Cells (105) are bonded directly to the Panel (103) or bonded/mounted to a film which is then secured to the Panel (103). Velcro® Strips (106) are secured to opposing edge surfaces of the elastically deployable panel (103) to ensure a rolling/linear deployment. Two Mandrel Loops (107) are located within the two opposing edges of the Roll (104) and are used to initiate the rolling behavior of the array during stowage. When the solar array nears full deployment, the two Mandrel Loops (107) rotate to the back side of the solar array.
Figure 4:
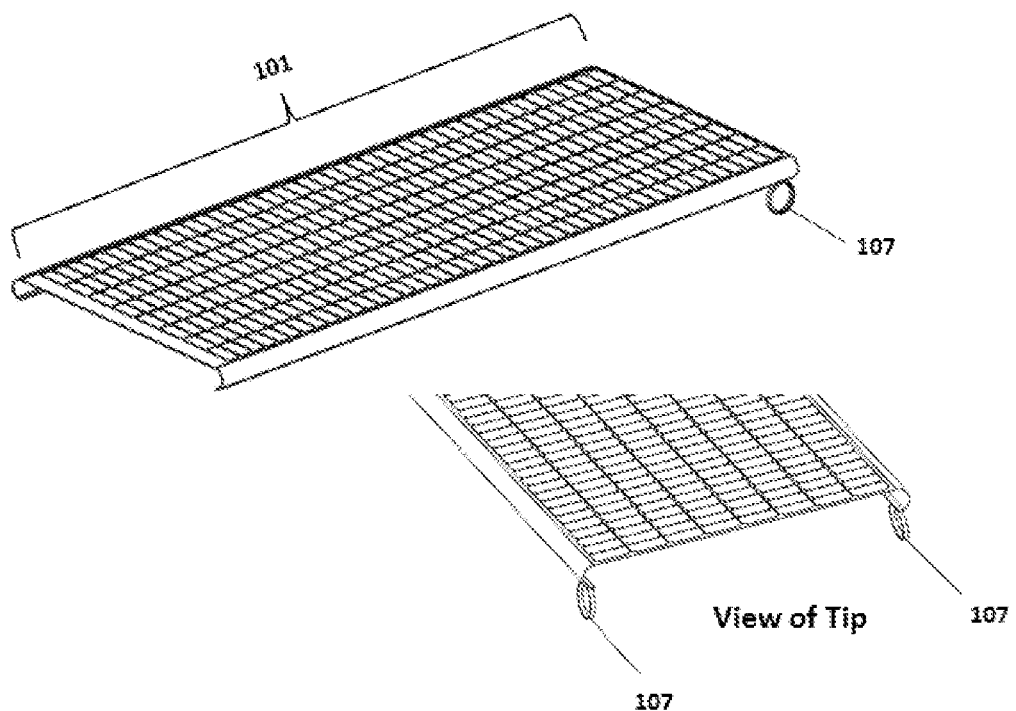
FIG. 4: Isometric view showing the elastically deployable panel structure solar array, cylindrical stowed configuration (101), in a fully deployed state. The figure identifies the locations of the Mandrel Loops (107) after the array reaches full deployment.
Figure 5:
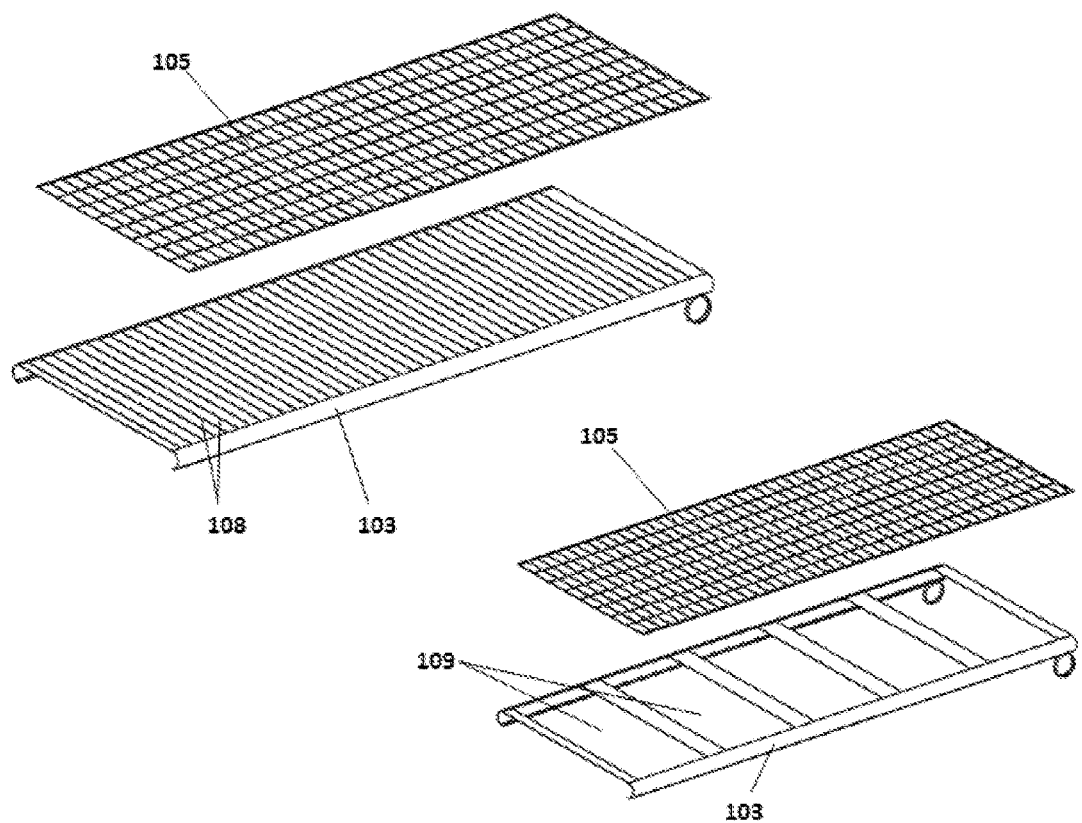
FIG. 5: Semi-exploded view of the elastically deployable panel structure solar array in a fully deployed state. Panel Slits (108) may be added to the panel (103) that correspond to spaces between rows of solar cells (105). The Panel Slits (108) facilitate "faceting" of the stowed array in order to minimize bending stresses within the Solar Cells (105) and the cell-to-panel bond stresses. Alternatively, Panel Cutouts (109) may be inserted into the Panel (103). Panel cutouts are used to reduce the weight of the system and tailor the stowage characteristics of the solar array. The Solar Cell (105) assembly is bonded or secured to the Elastically Deployable Panel (103).
Figure 6:
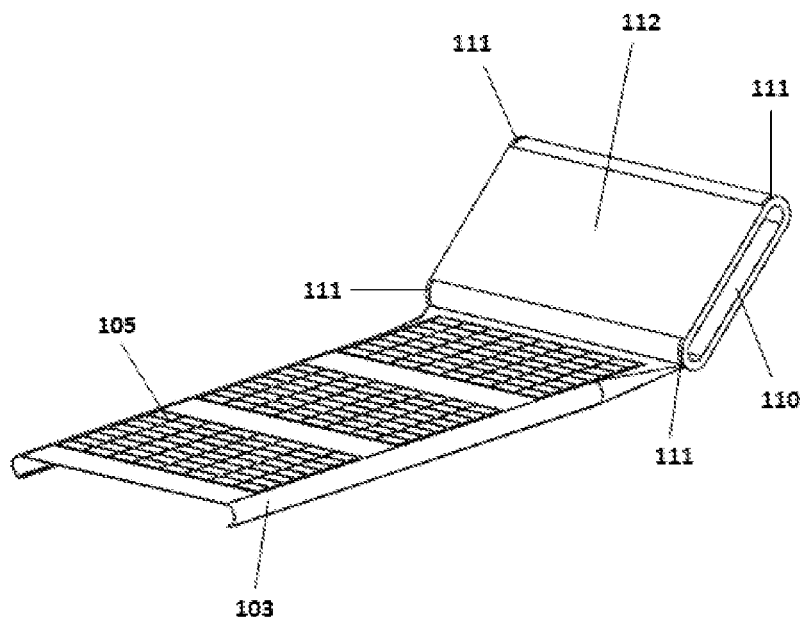
FIG. 6: Isometric view showing the elastically deployable panel structure solar array (pill-shaped stowed configuration) in a partially deployed state. The Elastically Deployed Panel Structure (103) is fully deployed at the base which is the attachment interface for the spacecraft and forms an Elongated Roll (112) at the outboard tip. Solar Cells (105) are bonded directly to the Panel (103) or bonded/mounted to a film which is then secured to the Panel (103). Interlocking material segments (111), which are also referred to herein as Velcro® segments (111), are secured to the curved ends of the Elongated Mandrel (110). Velcro® Segments are also secured to the edges of the Panel (103) between the areas populated with Solar Cells (105) where panel bending occurs. The Velcro® Segments (111) ensure a rolling/linear deployment. Two Elongated Mandrels (110) are located within the two opposing edges of the Elongated Roll (112) and are used to initiate the rolling behavior of the array during stowage. When the solar array nears full deployment, the two Elongated Mandrels (110) rotate to the back side of the solar array.
Figure 7:
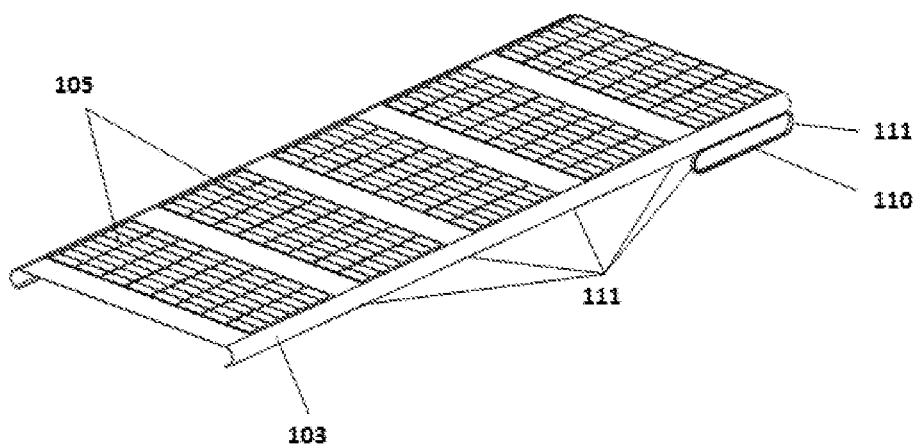
FIG. 7: Isometric view showing the elastically deployable panel structure solar array (pill-shaped stowed configuration) in a fully deployed state. The figure provides location and spacing information of the Solar Cells (105) attached to the Panel Structure (103). The figure also identifies the locations of the Elongated Mandrels (110) and the Velcro® Segments (111).
Figure 8:
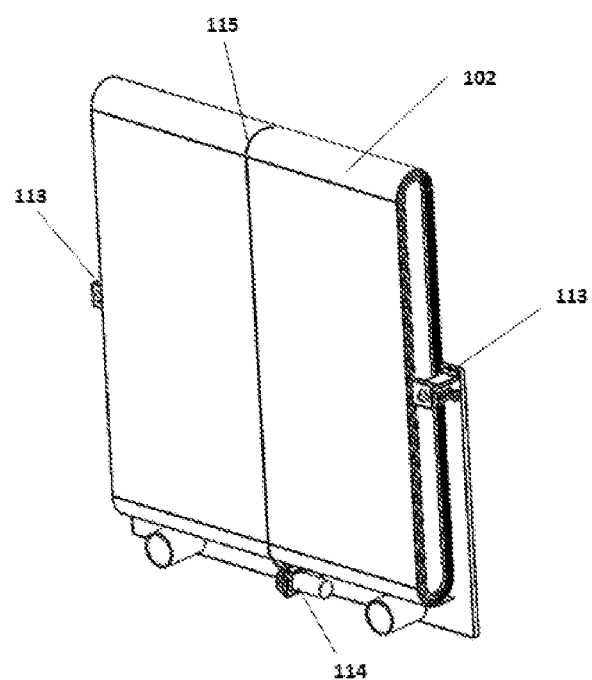
FIG. 8: Isometric view showing the elastically deployable panel structure solar array (pill-shaped stowed configuration) in a fully stowed state. The Elastically Deployed Panel Solar Array (102) is stowed in a compact elongated roll against the spacecraft. The base of the Solar Array (102) is attached to the spacecraft at a minimum of two locations. Two Launch Tiedowns (113) are used to secure the solar array to the spacecraft during launch. A Damper/Reel/Lanyard Assembly (114) slowly pays out the Lanyard (115) that forms an expanding loop to limit the rate of array deployment. Alternatively, the Damper/Reel/Lanyard assembly can be positioned to allow for Lanyard (115) attachments at the edges of the solar array.

The first identified embodiment of the Elastically Deployable Panel Structure for Space Applications (101) is shown in FIG. 1, FIG. 3 and FIG. 5. This embodiment features a compact cylindrical stowage volume. The panel structure may be constructed from fiber reinforced composite material or a high-strength metal sheet. Low coefficient of thermal expansion (CTE) composite materials provide increased thermal stability on orbit. One panel segment or multiple discrete panel segments that are mechanically connected may be used to fabricate the deployable panel. The Elastically Deployed Panel Structure (103) is fully deployed at the base which is the attachment interface for the spacecraft and forms a Roll (104) at the outboard tip. Solar Cells (105) are bonded directly to the Panel (103) or bonded/mounted to a film which is then secured to the Panel (103). Velcro® Strips (106) are secured to opposing edge surfaces of the elastically deployable panel (103) to ensure a rolling/linear deployment. Two Mandrel Loops (107) are located within the two opposing edges of the Roll (104) and are used to initiate the rolling behavior of the array during stowage. Panel Slits (108) or Panel Cutouts (109) may be inserted into the Panel (103) to change the stowage behavior of the structure and minimize stresses within the Solar Cells (105) and cell-to-panel bonds. The solar array deployment sequence is shown in FIG. 1. Solar array deployment is initiated by activating launch tiedowns that constrain the stowed array against the spacecraft. Multiple configurations of launch tiedowns may be used. When the solar array nears full deployment, the two Mandrel Loops (107) rotate to the back side of the solar array. Small, low-power, elastically deployed panel solar arrays may be deployed without rate control. If rate control is desired, a damper/lanyard system may be used. Alternatively, a damper/arm/roller system, located at the tip of the structure, may be used. The Elastically Deployable Panel Structure (101) is compatible with the various solar cell configurations. Due to its simple innovative construction, the deployable panel structure provides significant performance in terms of: high deployment reliability, low part count, compact stowage volume, reduced system cost, low mass.

Figure 2:
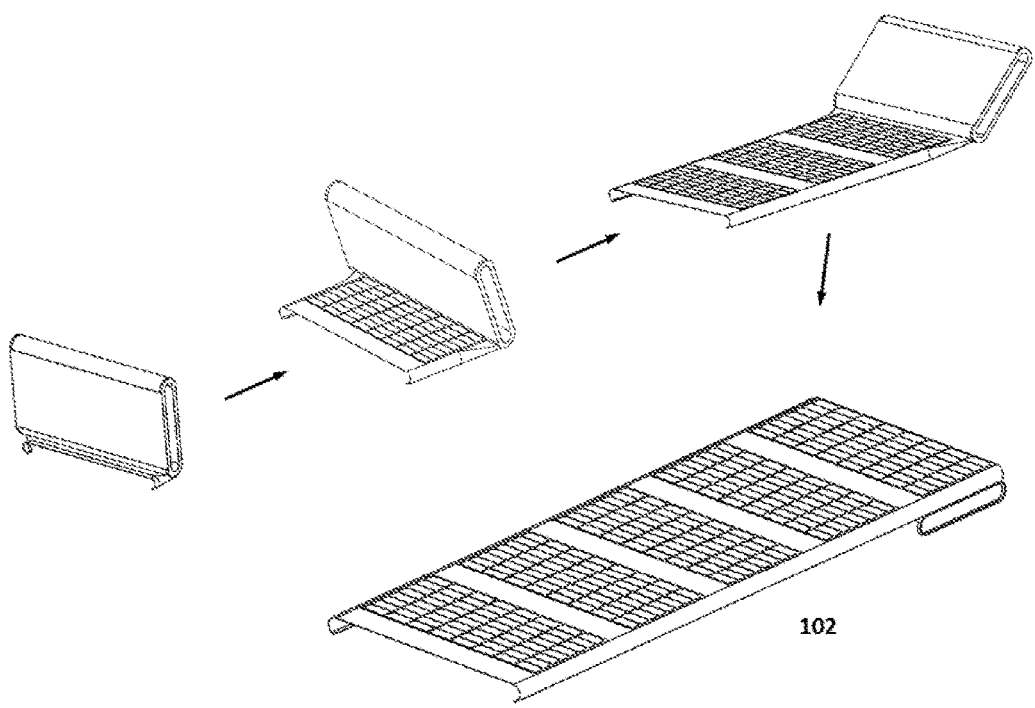
FIG. 2: Isometric view showing the deployment sequence of the elastically deployable panel structure solar array—pill-shaped stowed configuration (102).

The second identified embodiment of the Elastically Deployable Panel Structure for Space Applications (101) is shown in FIG. 2, FIG. 6, FIG. 7, and FIG. 8. This embodiment features a low profile pill-shaped compact cylindrical stowage volume. The panel structure may be constructed from fiber reinforced composite material or a high-strength metal sheet. Low coefficient of thermal expansion (CTE) composite materials provide increased thermally stability on orbit. One panel segment or multiple discrete panel segments that are mechanically connected may be used to fabricate the deployable panel. The Elastically Deployed Panel Structure (103) is fully deployed at the base which is the attachment interface for the spacecraft and forms an Elongate Roll (112) at the outboard tip. Solar Cells (105) are bonded directly to the Panel (103) or bonded/mounted to a film which is then secured to the Panel (103). Velcro® Segments (111) are secured to the curved ends of the Elongated Mandrel (110). Velcro® Segments are also secured to the edges of the Panel (103) between the areas populated with Solar Cells (105) where panel bending occurs. The Velcro® Segments (111) ensure a rolling/linear deployment. Two Elongated Mandrels (110) are located within the two opposing edges of the Elongated Roll (112) and are used to initiate the rolling behavior of the array during stowage. When the solar array nears full deployment, the two Elongated Mandrels (110) rotate to the back side of the solar array. Panel Slits (108) and Panel Cutouts (109) may be used with this embodiment to modify the deployment characteristics of the structure and/or minimize the mass. The solar array deployment sequence is shown in FIG. 2. Solar array deployment is initiated by activating Launch Tiedowns (113) that constrain the stowed array against the spacecraft. Multiple configurations of launch tiedowns may be used. When the solar array nears full deployment, the two Mandrel Loops (107) rotate to the back side of the solar array. Small, low-power, elastically deployed panel solar arrays may be deployed without rate control. If rate control is desired, a Damper/Reel/Lanyard Assembly (114), (115) may be used. The Elastically Deployable Panel Structure (102) is compatible with the various solar cell configurations. Due to its simple innovative construction, deployable panel structure provides significant performance in terms of: high deployment reliability, low part count, compact low-profile stowage volume, reduced system cost, low mass.

The significance of the simple, innovative, elastically deployable panel assembly embodiments provides a revolutionary and positive performance impact to the small to mid-sized satellite end-user in terms of: Reduced cost, low mass, compact stowage volume, high specific power, reduced risk, high deployment reliability, high deployed stiffness, thermal stability and applicability and scalability to many missions. The elastically deployable panel solar arrays are compatible with all photovoltaic devices.

Having thus provided the foregoing description, what is claimed as new and desired to be protected by Letters Patent includes the following:

1. An elastically deployable panel structure for space solar array applications comprising:
   a unitary, continuous support structure having first and second opposing side edges, a first, stowed configuration and a second, deployed configuration, the stowed configuration having elastic strain energy, said elastic strain energy operable to power deployment of said support structure;
   wherein the support structure is configured to be operable as a mounting surface for solar cell arrays,
   and further wherein the first and second opposing side edges are curved downward with respect to a bottom surface of said support structure, each of said first and second opposing side edges forming a C-shaped open cylinder, when said support structure is in the deployed configuration.

2. The elastically deployable panel structure according to claim 1, wherein the panel support structure comprises a top surface, an inboard edge, an outboard edge, and opposing longitudinal side edges.

3. The elastically deployable panel structure according to claim 2, wherein at least one of said longitudinal edges comprises an attachment strip to direct deployment of said support structure during substantially all of a transition from the stowed configuration to the deployed configuration.

4. The elastically deployable panel structure according to claim 1, wherein the support structure defines a plurality of openings therein, each of said plurality of openings configured to receive a solar cell array therein.

5. The elastically deployable panel structure according to claim 4, wherein said solar cell arrays are retained within said openings in the panel support structure by tension imposed by direct contact between the edges of said plurality of openings and the edges of said solar cell arrays.

6. An elastically deployable panel structure for space solar array applications comprising:
   a unitary, continuous support structure having a first, stowed configuration and a second, deployed configuration, the stowed configuration having elastic strain energy, said elastic strain energy operable to power deployment of said support structure,
   wherein the support structure defines a plurality of openings therein, each of said plurality of openings configured to receive a solar cell array therein, and further wherein said solar cell arrays are contained within said openings in the support structure by tension imposed by direct contact between the edges of said plurality of openings and the edges of said solar cell arrays.

7. The elastically deployable panel structure according to claim 6, wherein the support structure comprises opposing longitudinal side edges, at least one of said longitudinal side edges comprising an attachment strip to direct deployment of said support structure during substantially all of a transition from the stowed configuration to the deployed configuration.

\* \* \* \* \*